Nov. 4, 1952  R. O. STEVENSON ET AL  2,616,358
TOASTER
Filed Oct. 10, 1947  3 Sheets-Sheet 1
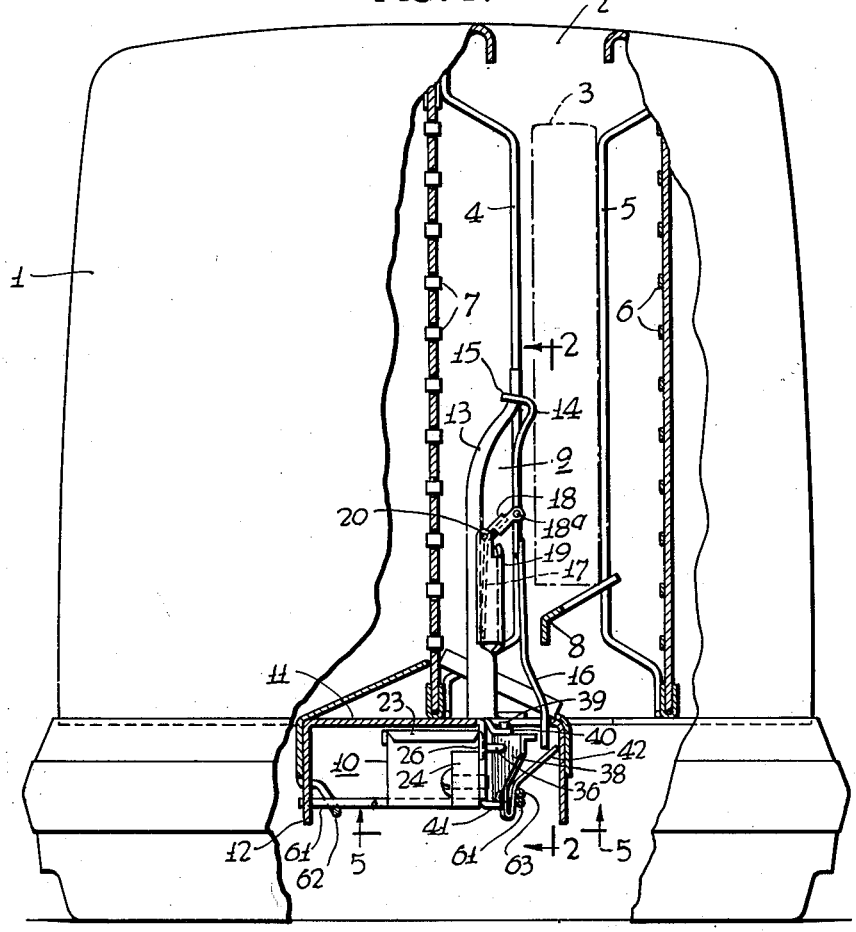
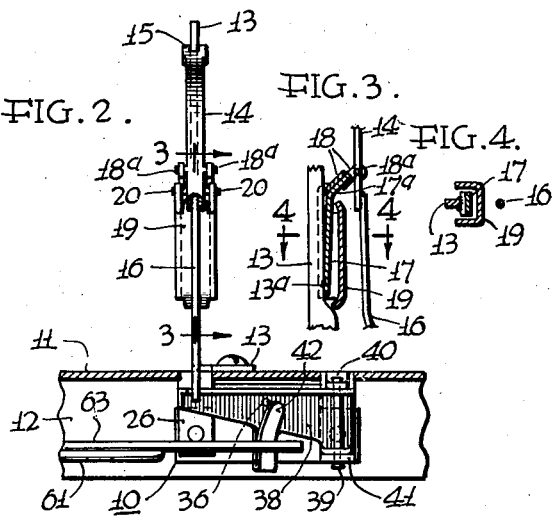
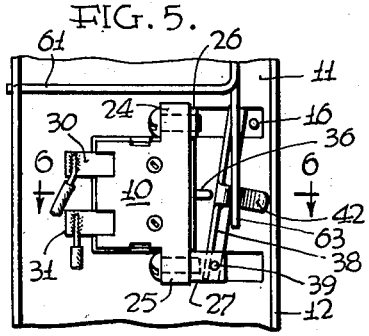
Inventors:
Robert O. Stevenson &
Charles R. Turner
by their Attorneys
Howson & Howson

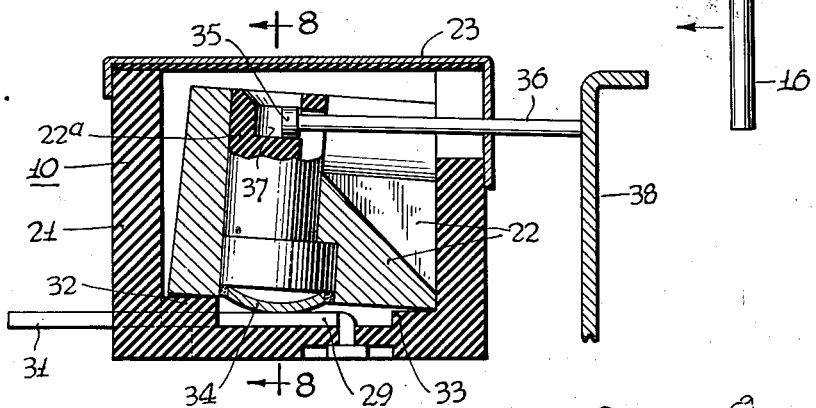
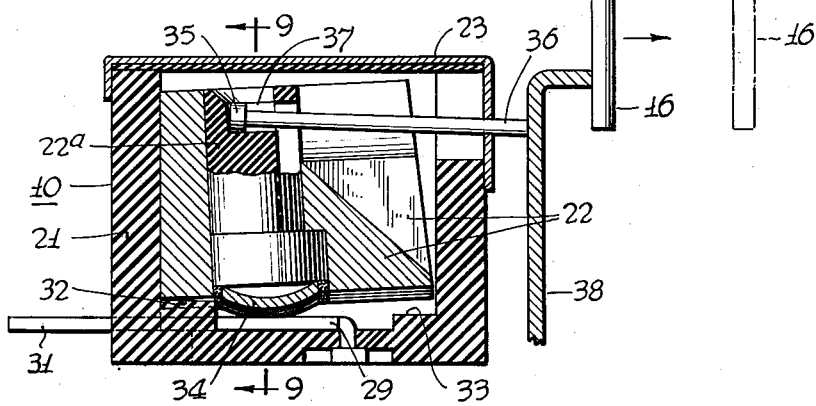
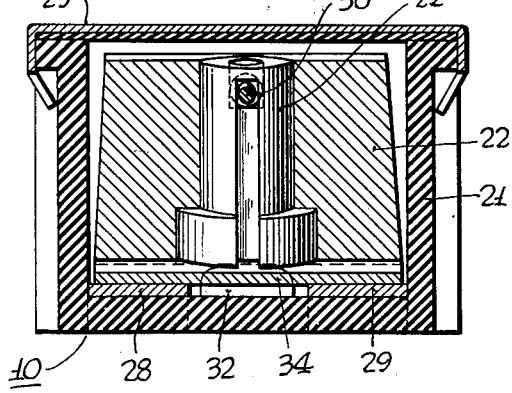 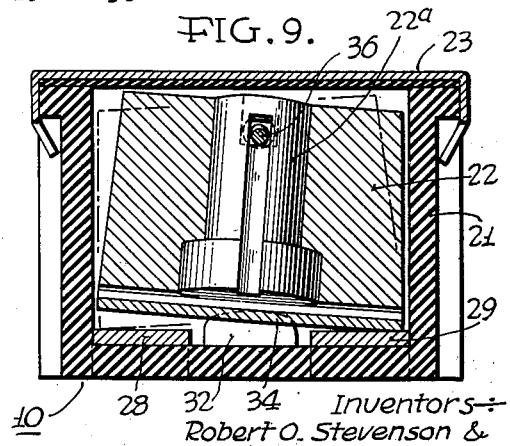

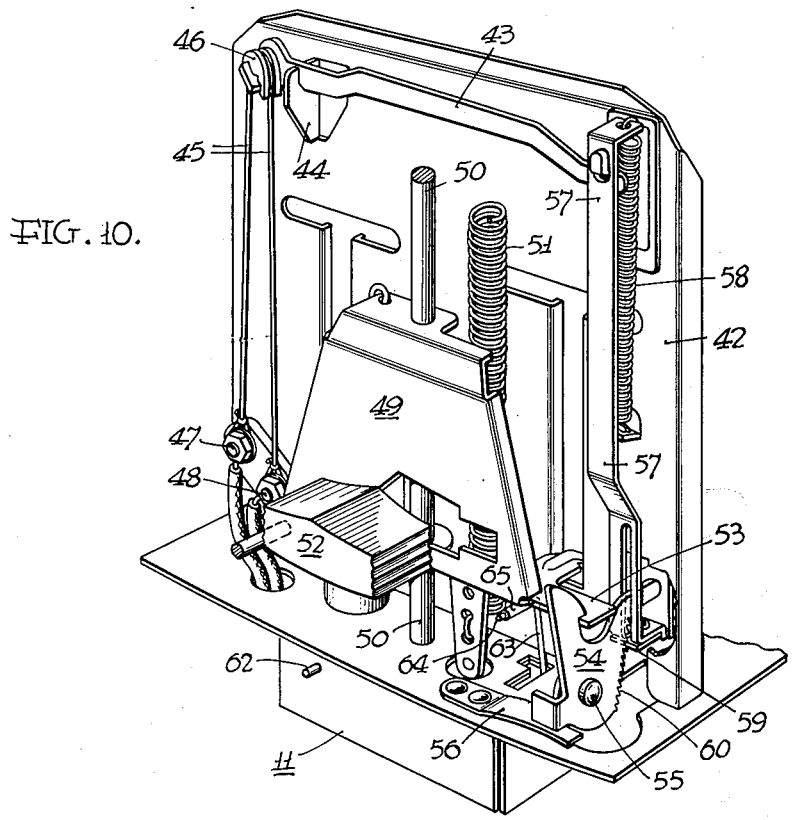
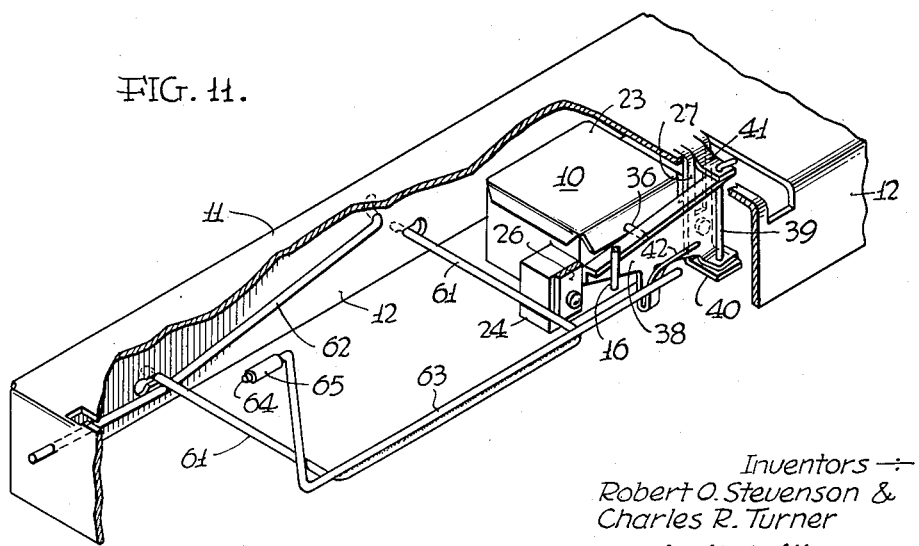
Inventors —
Robert O. Stevenson &
Charles R. Turner
by their Attorneys
Howson & Howson Patented Nov. 4, 1952

2,616,358

UNITED STATES PATENT OFFICE 2,616,358

TOASTER

Robert O. Stevenson, Philadelphia, and Charles R. Turner, Springfield Township, Montgomery County, Pa., assignors to Proctor Electric Company, Philadelphia, Pa., a corporation of Pennsylvania Application October 10, 1947, Serial No. 779,120

6 Claims. (Cl. 99—329)

This invention relates to toasters, and more particularly to automatic toasters having thermostatic control means to terminate the toasting cycle.

More specifically, this invention contemplates the provision of an improved toaster of this character which will produce successive slices of toasted bread having uniformly similar color. In toasters of this character, having a bread surface temperature sensitive thermostat to terminate the heating, or toasting cycle, provisions must be made to correct, or compensate, for the rise in temperature inside the body of the toaster as successive slices of toast are made. In toasters where it is desirable to produce successive slices of toast having similar color and texture, it is important that the toasting cycle be terminated when the surface temperature of the toast has been raised to the proper browning, or searing, level. When a thermostat, which is to be responsive to this bread surface temperature, is placed inside the body of a toaster it is subjected to extraneous heats other than that of the bread. The greatest of these is the general air temperature of the space in which it is located. Another is the radiant heat from the toaster heating elements. It is, therefore, desirable to provide means for correcting for the effect of these heats on the flexure of the thermostatic bimetallic element, which is to be responsive to the temperature of the bread.

One object of this invention is to provide a compensated bimetallic thermostat for electric bread toasting devices which will permit successive slices of toasted bread to be produced having similar color.

Other objects and features of the invention will be apparent from the following description.

In the accompanying drawings:

Fig. 1 is an end elevational view of a toaster embodying the invention, with a portion of the casing broken away and with certain elements shown in section for the purpose of illustration.

Fig. 2 is a sectional view taken along line 2—2 of Fig. 1.

Fig. 3 is a fragmentary sectional view taken along line 3—3 of Fig. 2;

Fig. 4 is a sectional view taken along line 4—4 of Fig. 3;

Fig. 5 is a fragmentary bottom view taken along line 5—5 of Fig. 1.

Fig. 6 is a large-scale sectional view taken along line 6—6 of Fig. 5, illustrating the switch in closed position.

Fig. 7 is a similar view illustrating the switch in open position.

Fig. 8 is a sectional view taken along line 8—8 of Fig. 6.

Fig. 9 is a sectional view taken along line 9—9 of Fig. 7.

Fig. 10 is a perspective view showing an end plate of the toaster and the mechanism associated therewith; and Fig. 11 is a perspective view illustrating the controlling mechanism employed in conjunction with the switch.

Referring first to Fig. 1, there is shown a toaster 1 of the type in which two bread wells are provided to receive two slices of bread. In the illustration, one of the bread wells is shown at 2, and a slice of bread is represented in dot-and-dash outline at 3. As is customary in such toasters, each bread slice is supported between vertical wire elements 4 and 5 which define the bread-receiving well. The bread slice represented is subjected to heat from the outer heating element 6 and the inner heating element 7, the latter being common to both of the bread wells as is customary in many toasters of this type. A vertically movable bread carriage, partly shown at 8, is adapted to be lowered into the position shown to support the bread slices and is automatically raised to partially eject the bread slices at the end of the toasting operation, as is also customary in toasters of this general type. It will be understood that the toaster construction as thus far described is of conventional form and requires no further description.

In accordance with the present invention, there is provided a novel thermostat 9 which actuates a switch 10, as hereinafter described. The switch 10 is connected in series with the heating elements so as to control the energization thereof. A plate 11 serves to support both the thermostat and the switch. It will be seen that the thermostat 9 is disposed above the plate 11, while the switch 10 is disposed below the said plate within an inverted channel formed by walls 12 turned down from the plate 11.

Referring to the thermostat 9, as shown in Figs. 1 to 4, a rigid supporting member 13, secured to the plate 11, serves to support the elements of this device. A main bimetallic element 14 has its upper end apertured at 15 and is loosely supported by the rigid support 13 whose upper end extends through the aperture of element 14. The element 14 is arranged and shaped so as to be responsive to the surface temperature of the bread slice 3. As may be seen in Fig. 1, the upper portion of element 14 is curved outwardly and extends into the bread well so as to be engaged by the bread slice, while the lower part of said element is disposed behind the plane of wires 4 which forms one side of the bread well. By virtue of this arrangement, the thermal association of the element 14 with the bread slice is accurately controlled to obtain optimum influence of the surface temperature of the bread slice on the bimetallic element 14. It has been found that limited engagement of the thermostatic element with a bread slice, as provided in the present device, causes the thermostatic element to perform much more uniformly in conjunction with a bread slice having irregular shape or texture. Furthermore, it has been found that the thermostatic element in such arrangement is least affected by variations in the moisture content of the bread.

At the lower end of the bimetallic element 14 there is provided a stiff wire extension 16 which is fixedly secured to the element 14 and which extends downwardly through an opening in the plate 11. This rod serves to actuate the switch 10 as hereinafter described.

The thermostat 9 further comprises a second bimetallic element 17 which is welded, or otherwise securely attached, to the supporting member 13 at 13a. The upper portion of the bimetal element 17 is partially flanged at 17a to accommodate the pivot link 18 which has extending hinge pins 20 and hinge pivots 18a. The pivot link 18 is fixedly secured to the bimetallic element 17 at its upper end 17a, and is pivotally attached to the element 14 at 18a. The purpose of the bimetal element 17 is to minimize the effects on the main bimetal 14 of the direct heat from the heating element 7 and of the variations and increase in the air temperature within the casing of the toaster. The arrangement is such that the element 17 acts in opposition to the element 14, so that the wire 16 is subjected to a differential action. The lower end of the element 14 is deflected toward the left, as viewed in Fig. 1, in response to the heat received by said element, while the upper portion of element 17 deflects toward the right in response to heat received thereby. Thus, the element 17 compensates for the undesired temperature influences to which the main bimetallic unit 14 is subjected.

A metal shield 19 is associated with the compensating thermostatic element 17 to minimize the effect of the bread surface temperature thereon. This shield is pivotally attached at its upper end to the lower end of link 18 by means of the pins 20 thereon, so that the shield is freely suspended and does not interfere with the motion of the element 17. The bimetal element 17 is enclosed on three sides by the shield 19, and is partially shielded by the support 13 on the fourth side. Thus the element 17 is shielded from the quick cooling effect of untoasted bread slices, and at the same time this element is responsive to the temperature influences for which it is to compensate.

Referring now to the switch 10, this device is illustrated in Figs. 6 to 9 which show it greatly enlarged for the sake of clear illustration. It comprises a hollow body 21 formed of insulating material such as a suitable ceramic material, within which there is loosely disposed a small weight 22 preferably composed of a metal block and having an inset member 22a of insulating material such as ceramic material. A thin metallic lid 23 is removably associated with the upper part of the hollow body 21 and serves to close the same. The body 21 is formed with attachment ears 24 and 25 (see Fig. 5) by means of which it is suspended from the plate 11, being secured to bracket elements 26 and 27 struck-out from the plate. At the bottom of the hollow body 21, there are two spaced contact bars 28 and 29 having terminal elements 30 and 31, which extend to the outside of the switch body and by means of which electrical connection is made to said contact bars. Also at the bottom of the hollow body 21 there is a fulcrum element 32 and a shoulder 33 on which the weight 22 is adapted to rest. The fulcrum element 32 is rounded at the top thereof, so that the weight 22 may rock thereabout as hereinafter described. At the bottom of the weight there is a contact bridge 34 which is adapted to engage the contact bars 28 and 29. The upper part of the inset 22a is formed to loosely retain the head 35 of a pin 36 which projects to the outside of the hollow body. Thus the head 35 is loosely disposed in a recess or socket 37.

The pin 36 is actuated by the thermostat 9 through the wire 16 and a lever 38 (Fig. 1) which is mounted on a pivot pin 39 (Fig. 11) supported by elements 40 and 41. Element 40 is formed as an extension of the bracket element 27, while element 41 is formed as an ear struck out from element 27. The lever 38 is in the form of a light metal vane and it is freely supported on the pivot pin 39. This lever has a U-shaped resilient finger 42, the purpose of which will be seen presently.

It will be seen that the switch 10 is a gravity-type switch, and it is self-closing under the influence of gravity acting on the weight 22. In the absence of any force exerted on the pin 36, the weight is disposed as shown in Figs. 6 and 8, resting on the shoulder 33 and having the contact bridge 34 in engagement with the contact bars 28 and 29. If the lever 38 is free, the switch is permitted to close. As indicated in Fig. 6, the wire 16 is normally out of engagement with the lever 38 but it moves towards said lever as the bimetal element 14 flexes in response to increasing surface temperature of the associated bread slice. When the wire 16 has moved sufficiently, it engages the lever 38 and actuates the pin 36 through said lever, as illustrated in Fig. 7, causing opening of the switch as hereinafter described, the weight 22 rocking about the fulcrum element 32. Thus the switch is opened against the gravitational force acting on the weight 22. The interruption of the toasting operation causes the bimetal element 14 to return to its normal position and consequently the wire 16 moves away from lever 38 as indicated in Fig. 7. The manner in which the toasting operation is terminated will be described later.

The gravity-type switch has important operating characteristics which enable it to cooperate with the thermostat 9 to the end that each bread slice will be toasted to the same color. When the switch is first permitted to close with the toaster connected to a source of current, which is during the usual factory test, the contact bridge 34 engages one of the stationary contacts slightly ahead of the other. This is due to the structure of the switch as above described. It causes a slight welding of the contacts on the side where they close last, due to the current flowing through the contacts at the point where the circuit is completed. When the switch is subsequently opened, the weld keeps the contacts together on that side and the weight 22 tilts laterally, as shown in Fig. 9. When the switch closes again, a weld is formed at the opposite side, and in the meantime the first weld is weakened by the bending action incident to the tilting movement of weight 22. When the switch is again opened, the weakened weld breaks and the contacts open on that side. The later-made weld on the opposite side remains intact but is weakened by the bending action. The condition of the switch at this time is indicated in broken lines in Fig. 9. When the switch next closes, a fresh weld is formed at the side where the first weld was formed, and when the switch next opens the weakened weld on the opposite side is broken. This operation continues during use of the switch, the contacts being opened and closed first on one side and then on the other side.

While the weight 22 appears rather massive in Figs. 6 to 9, it should be remembered that these figures show the switch on a greatly enlarged scale, and the weight 22 has a small mass and is movable by a small force. Moreover, the welds which form during operation of the switch, as above described, are only slight welds which when weakened as described, do not prevent opening of the switch by a small force. In fact, the action involving alternate welding of the contacts on the opposite sides greatly enhances the operation of the toaster from the standpoint of toasting the successive bread slices to the same color, as explained below.

The thermostatic bimetal element 14 exerts a relatively slight force as it deflects in response to the rising temperature of the bread slice. Any variation in the load imposed on element 14 will require a corresponding variation in the force exerted by said element before the switch contacts will open; and any variation in the exerted force will produce a variation in the color or crispness of the toasted bread, which is undesirable.

Now any switch that would be usable in conjunction with the thermostat would exhibit slight welding of the contacts during closing, because this is inherent in any such switch. While there is a fair degree of uniformity in the force required to break the weld during successive openings of the switch, the slight variations in the breaking force which must be exerted by the thermostat are adequate to produce noticeable variations in toast color on successive toasting operations. This is overcome in the present instance by virtue of the weld-weakening action that takes place during the operation of the switch 10, as above described. The preweakened welds require considerably less breaking force and as a result, the variations are also reduced. The smaller variations in the breaking force produce imperceptible variations in toast color during the toasting of successive break slices.

In addition to the above results, the action of the switch distributes the contact wear evenly on both sides, and it also minimizes the danger of switch failure due to excessive sticking of the contacts.

The foregoing results have been amply demonstrated by toasters constructed according to the present invention, and are not merely theoretical.

Referring now to Fig. 10, the mechanism of the toaster for latching and releasing the bread carriage may be of the character disclosed in United States Patent No. 2,301,070 issued November 3, 1942 to J. W. Myers. The end plate 42 of the toaster carries a lever 43 which is supported on a fulcrum ear 44 struck-out from said plate. A heat expansible wire 45 is looped about an insulating saddle 46 on one end of said lever, and the ends of said wire are secured to terminals 47 and 48. The bread carriage includes a plate 49 which is slidable on a vertical rod 50, and the bread carriage is urged upwardly by a spring 51. The carriage is moved downwardly against the action of said spring by means of a knob 52. At the bottom of the plate 49 there is an extending finger 53 which is engageable by a latch member 54 pivotally mounted at 55. A leaf spring 56 urges the latch member toward its effective position. An arm 57 is freely carried at the end of lever 43 and is urged downwardly and forwardly by a spring 58. At its lower end the arm 57 carries a pawl 59 which is adapted to engage teeth 60 on the latch member 54.

When the bread carriage is raised, the finger 53 engages arm 57 so as to disengage the pawl 59 from the latch member 54, permitting the latter to assume its normal position. When the bread carriage is lowered, it is latched by the engagement of member 54 with finger 53. The expansible wire 45 is included in the electric circuit of the toaster, e. g. in series with the heating elements and the switch 10, and the current flowing through said wire causes it to expand. The cessation of current flow at the end of the toasting operation causes the wire 45 to cool and contract. Since the pawl 59 is in engagement with the teeth 60, the contraction of wire 45 effects slight upward movement of arm 57 through lever 43, thus tripping the latch member 54 and releasing the bread carriage which is moved upwardly by the spring 51.

When the bread carriage is in its raised position, the switch 10 is held open by the mechanism shown in Fig. 11. A U-shaped lever 61 is pivotally supported at its ends on the depending wall 12 of plate 11, and said lever is urged upwardly by a spring 62. The lever 61 carries a rod 63, one end of which is adapted to engage the resilient finger 42 on lever 38. The other end of rod 63 extends upwardly and is bent to form a finger 64 carrying a roller 65. The latter is disposed in the path of travel of the bread carriage, as shown in Fig. 10.

When the bread carriage is in raised position, the rod 63 is moved upwardly under the influence of spring 62 and engages finger 42, holding the switch 10 open through the medium of lever 38. When the bread carriage is lowered, it engages finger 64 and depresses the rod 63 causing the latter to be moved out of engagement with lever 38. The switch 10 is then permitted to close under the influence of gravity.

When the switch is opened by the thermostat as above described, the latch 54 is tripped and the bread carriage rises. The switch is then held open by rod 63.

Thus it will be seen that the gravity-biased switch is controlled both by the bread carriage and by the thermostat through the associated elements. The one switch serves both to close the toaster circuit when the bread carriage is lowered, and to open the circuit and cause release of the bread carriage when the toasting operation is finished.

As above mentioned, the thermostat and the switch cooperatively assure efficient operation of the toaster to the end that successive bread slices will be toasted to the desired color. The thermostat is truly responsive to the surface temperature of the bread and is not appreciably affected by other factors or conditions. The switch, when closed, has only the force of gravity acting on its contacts. Hence the contact pressure is always constant. Moreover, the switch is simple and rugged, and it has the desirable operating characteristics hereinbefore described.

From the foregoing description, it will be seen that the invention has provided a novel and efficient toaster. It will be understood, of course, that the invention is not limited to the specific structure illustrated but is capable of various modifications. While the toaster illustrated and described has no provision for adjustment to give different degrees of toasting, this may easily be embodied, e. g. by movably supporting the switch and providing manually adjustable means for varying the position of the switch in relation to the wire 16.

We claim:

1. In a bread toaster, means defining a vertical bread slice-receiving well, heating means including heating elements disposed on opposite sides of said well, a generally vertical rigid support mounted between said well and one of said heating elements, a generally vertical thermo-motive element arranged to be primarily thermally-responsive to the surface temperature of a bread slice in said well, said element having its upper end loosely secured to said support, and a compensating thermomotive element rigidly attached to said support and pivotally connected to said first element, and arranged to be thermally-responsive both to said heating means and the air temperature within the toaster.

2. In a bread toaster, means defining a vertical bread slice-receiving well, heating means including heating elements disposed on opposite sides of said well, a generally vertical rigid support mounted between said well and one of said heating elements, a generally vertical thermomotive element arranged to be primarily thermally-responsive to the surface temperature of a bread slice in said well, said element having its upper end loosely secured to said support, and a compensating generally vertical thermo-motive element having its lower end rigidly attached to said support and its upper end pivotally connected to said first element, and arranged to be thermally-responsive both to said heating means and the air temperature within the toaster.

3. In a bread toaster, means defining a vertical bread slice-receiving well, heating means including heating elements disposed on opposite sides of said well, a generally vertical rigid support mounted between said well and one of said heating elements, a generally vertical thermo-motive element arranged to be primarily thermally-responsive to the surface temperature of a bread slice in said well, said element having its upper end loosely secured to said support, a compensating generally vertical thermo-motive element having its lower end rigidly attached to said support and its upper end pivotally connected to said first element, and arranged to be thermally-responsive both to said heating means and the air temperature within the toaster, and a heat shield for said compensating element mounted for movement therewith and interposed between the bread well and said second element.

4. In a bread toaster, means defining a vertical bread slice-receiving well, heating means including heating elements disposed on opposite sides of said well, a generally vertical rigid support mounted between said well and one of said heating elements, a generally vertical thermo-motive element arranged to be primarily thermally-responsive to the surface temperature of a bread slice in said well, said element having its upper end loosely secured to said support, a compensating generally vertical thermo-motive element having its lower end rigidly attached to said support and its upper end pivotally connected to said first element, and arranged to be thermally-responsive both to said heating means and the air temperature within the toaster, and a channel-shaped heat shield for said compensating element mounted for movement therewith and arranged in partially surrounding relation to said compensating element to shield the latter from the surface temperature of said bread slice.

5. In a bread toaster, means defining a bread slice receiving well, heating means including heating elements disposed on opposite sides of said well, a support member, a thermo-motive element having one of its ends loosely secured to said support member and positioned at a side of said well so as to be primarily responsive to the surface temperature of a bread slice in said well, and a compensating thermo-motive element rigidly attached to said support member and pivotally connected to said first element, and arranged to be thermally responsive both to said heating means and the air temperature within the toaster.

6. In a bread toaster, means defining a bread slice receiving well, heating means including heating elements disposed on opposite sides of said well, a support member, a thermo-motive element having one of its ends loosely secured to said support member and arranged to be primarily responsive to the surface temperature of a bread slice in said well, a compensating thermo-motive element rigidly attached to said support member and pivotally connected to said first element, and arranged to be thermally responsive both to said heating means and the air temperature within the toaster, and a heat shield for said compensating element mounted for movement therewith and interposed between the bread well and said compensating element.

ROBERT O. STEVENSON.
CHARLES R. TURNER.

REFERENCES CITED

The following references are of record in the file of this patent:

UNITED STATES PATENTS

| Number | Name | Date |
|---|---|---|
| 1,765,297 | Bogle | June 17, 1930 |
| 1,957,343 | Hurxthal et al. | May 1, 1934 |
| 1,984,063 | Graham | Dec. 11, 1934 |
| 2,099,210 | Ireland | Nov. 16, 1937 |
| 2,196,393 | Ireland | Apr. 9, 1940 |
| 2,250,997 | Miller | July 29, 1941 |
| 2,271,520 | Strauss | Feb. 3, 1942 |
| 2,301,070 | Myers | Nov. 3, 1942 |
| 2,332,518 | Koci | Oct. 26, 1943 |
| 2,342,461 | Ettinger et al. | Feb. 22, 1944 |
| 2,367,500 | Huck | Jan. 16, 1945 |
| 2,426,620 | Koci | Sept. 2, 1947 |